P. KOINZER.
VEGETABLE GRATER.
APPLICATION FILED FEB. 2, 1921.
1,376,704.
Patented May 3, 1921.
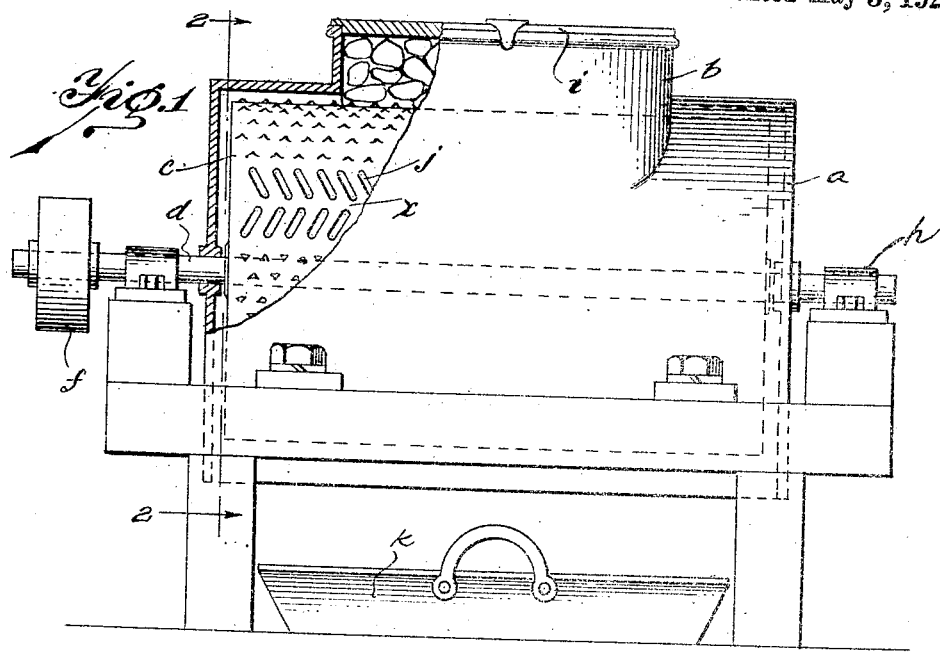
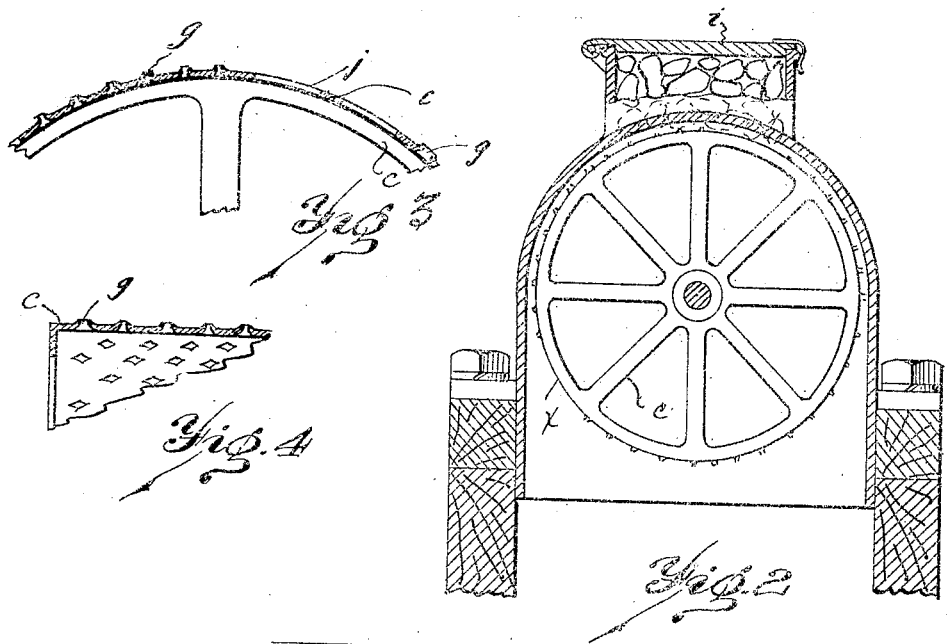
INVENTOR.
PAUL KOINZER
BY
Stuart C Barnes
ATTORNEY.

UNITED STATES PATENT OFFICE.

PAUL KOINZER, OF MOUNT CLEMENS, MICHIGAN.

VEGETABLE-GRATER.

1,376,704.  Specification of Letters Patent.  Patented May 3, 1921.

Application filed February 2, 1921. Serial No. 441,729.

*To all whom it may concern:*

Be it known that I, PAUL KOINZER, a citizen of Germany, residing at Mount Clemens, in the county of Macomb and State of Michigan, have invented certain new and useful Improvements in Vegetable-Graters, of which the following is a specification.

This invention relates to a machine for grating potatoes and other vegetables. The improvement consists in a means for evicting grated material from the body of the drum.

In the drawings,—

Figure 1 is a vertical front elevation partly in section.

Fig. 2 is a vertical cross section on the line 2—2 of Fig. 1.

Fig. 3 is a fragmentary cross section of the drum.

Fig. 4 is a fragmentary longitudinal section of the drum.

In machines for grating potatoes and other vegetables it is customary to provide the drum with a plurality of struck-out points which tear into the potatoes and tend to shred and grate them. However, these struck-out portions not only shred the potatoes but tend to shred some of the potato material into the drum. It is the object of my present invention to provide a reliable ejecting means for efficiently throwing out that portion of the grated vegetables that gets into the drum.

*a* designates the housing which is provided with a filler tube *b*. The drum *c* is mounted on the shaft *d* driven by a pulley *f*. The shaft is journaled in the journal blocks and cap plates *h*. The drum is formed of a cylindrical surface having a plurality of outwardly punched holes *g* which form points or abrading members. Vegetables or potatoes are placed in the filling tube and held down by a clamped lid *i* so that they cannot bob up when the drum rotates instead of being pressed against the drum to start the shredding or grating operation. As the drum speeds up the abrading points tear into the potatoes or vegetables and tend to shred and grate them. However, a considerable amount of shredded or grated material is driven into the inside of the drum through the perforations *g*. It is at this point that my improvement attaches. In place of having the abrading points extend clear around the drum, I provide a zone *x* that is provided with discharge orifices *j*. Obviously the material collecting in the bottom of the drum will tend to remain at the bottom of the drum if the material is free, the drum simply turning through it and agitating it as it rotates. When this discharging zone *x* of the drum turns around to the lowermost position, the accumulated material in the bottom of the drum will be thrown through the discharge orifices *j* into the receiving pan *k*.

If the discharge openings were simply straight slots or circular perforations, the action would be comparatively imperfect, but being disposed obliquely to the axis of the cylinder and being arranged in two rows of staggered oblique perforations, the action is as near perfect as may be. Not only does this arrangement insure every point in the longitudinal direction of the drum being at one time or another exposed to a discharge opening but these obliquely-arranged openings give the material plenty of time and opportunity to discharge notwithstanding the relatively rapid rotation of the cylinder. Furthermore, if the accumulated particles at any point along the drum are of such shape or disposition as not suitable to discharge by the openings running in one oblique direction, they may be capable of discharge through the openings running in the opposite oblique direction, which are possibly better calculated to discharge them. Hence the discharging through the zone *x* is at all times efficient and there is no chance for any substantial accumulation to be built up in the drum.

What I claim is:

1. In a machine for grating vegetables, the combination of a housing, a rotatable drum secured therein provided with a plurality of abrading points, said abrading points forming openings into the interior of the drum and the drum being formed also with a zone having a plurality of obliquely disposed orifices arranged to cover the entire longitudinal extent of the drum with openings to discharge the accumulations from the interior of the drum.

2. In a machine for grating vegetables, the combination of a housing, a drum secured therein provided on its periphery with a plurality of struck-out abrading points forming openings into the interior of the drum and having also a plurality of obliquely-disposed overlapping openings for discharging the accumulated material from the interior of the drum.

3. In a machine for grating vegetables, the combination of a housing, a drum rotatable therein provided on the major portion of its periphery with a plurality of struck-out abrading points having openings into the interior of the drum adjacent thereto, the said periphery having its minor portion provided with two rows of discharge orifices arranged in oppositely-directed oblique dispositions.

4. In a machine for grating vegetables, the combination of a housing, a rotatable drum therein provided with a periphery having a plurality of abrading points with openings into the interior of the drum arranged adjacent said points and also having a plurality of discharge orifices arranged in two rows of parallel openings, each row directed in an oblique direction opposite to the other row being in staggered relation with the respect to the openings in the other row.

In testimony whereof I affix my signature.

PAUL KOINZER.